(12) United States Patent
Lee et al.

(10) Patent No.: US 9,659,675 B2
(45) Date of Patent: May 23, 2017

(54) FUEL ROD AUTO-LOADING APPARATUS FOR NUCLEAR FUEL ASSEMBLY

(71) Applicant: KEPCO NUCLEAR FUEL CO., LTD., Daejeon (KR)

(72) Inventors: Ju Young Lee, Chungcheongnam-do (KR); Chang Hwan Hwang, Daejeon (KR); Hung Soon Chang, Daejoon (KR); Soon Ki Guk, Daejeon (KR); Yeon Doo Jung, Daejeon (KR); Ui Jea Lee, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 690 days.

(21) Appl. No.: 14/149,872

(22) Filed: Jan. 8, 2014

(65) Prior Publication Data

US 2014/0192945 A1 Jul. 10, 2014

(30) Foreign Application Priority Data

Jan. 8, 2013 (KR) .................. 10-2013-0002091

(51) Int. Cl.
*G21C 3/334* (2006.01)
*G21C 21/00* (2006.01)
*G21C 19/32* (2006.01)

(52) U.S. Cl.
CPC ............. *G21C 19/32* (2013.01); *G21C 3/334* (2013.01); *G21C 21/00* (2013.01); *Y02E 30/40* (2013.01)

(58) Field of Classification Search
USPC ................................ 376/268–270
See application file for complete search history.

(56) References Cited

U.S. PATENT DOCUMENTS

| 4,374,801 | A | * | 2/1983 | Albin | G21C 19/18 294/906 |
| 4,548,347 | A | | 10/1985 | Christiansen et al. | |
| 5,204,052 | A | * | 4/1993 | Walker | G21C 21/00 376/261 |
| 5,251,243 | A | * | 10/1993 | Nylund | G21C 3/334 29/723 |
| 5,490,185 | A | * | 2/1996 | Dent | G21C 19/18 376/258 |

FOREIGN PATENT DOCUMENTS

KR 10-2007-0103754 A 10/2007
KR 10-0982297 B1 9/2010

OTHER PUBLICATIONS

Korean Office Action mailed on Feb. 24, 2014.

* cited by examiner

*Primary Examiner* — Sean P Burke
(74) *Attorney, Agent, or Firm* — Rabin & Berdo, P.C.

(57) ABSTRACT

Disclosed is a fuel rod auto-loading apparatus for a nuclear fuel assembly, which disposes fuel rods in a fuel rod case in a bundle to assemble the fuel rods into the nuclear fuel assembly. The fuel rod auto-loading apparatus includes a fuel rod storage unit having a plurality of stacked racks for fuel rods, a fuel rod loading unit raised/lowered to the racks and transferring the fuel rods, a feeding unit placing the fuel rods in rows and loading the fuel rods into the fuel rod case, a fuel rod unloading unit selectively unloading some of the fuel rods stored in the fuel rod storage unit and transferring the fuel rods to the feeding unit, a fuel rod assembly lifter which is disposed parallel to the feeding unit, and a controller controlling driving of the fuel rod loading unit, the feeding unit, and the fuel rod unloading unit.

10 Claims, 15 Drawing Sheets

FUEL ROD AUTO-LOADING APPARATUS FOR NUCLEAR FUEL ASSEMBLY

BACKGROUND OF THE INVENTION

1. Field of the Invention

The present invention relates to a fuel rod auto-loading apparatus for a nuclear fuel assembly and, more particularly, to a fuel rod auto-loading apparatus for disposing fuel rods, each of which is assembled as a unit part, in a fuel rod case in a bundle to assemble the fuel rods into a nuclear fuel assembly.

2. Description of the Related Art

Nuclear reactors are facilities for artificially controlling a fission chain reaction of a fissionable material in order to use thermal energy generated from nuclear fission as power.

Referring to FIG. 15, a nuclear fuel assembly includes spacer grids 2 into which fuel rods are inserted, numerous guide thimbles 3 fixed to the spacer grids 2, an upper end fitting 3 fastened to upper ends of the guide thimbles 2, and a lower end fitting 4 fastened to lower ends of the guide thimbles 2. Each fuel rod is supported by dimples and springs formed on each spacer grid 2.

The fuel rod is made up of a cladding tube, end plugs, pellets, and springs. The fuel rod is manufactured by enriching uranium-235 of 2 to 5% to form a cylindrical nuclear fuel pellet of about 5 g, charging the pellets into the cladding tube, inserting the springs, and sealing the cladding tube using the end plugs.

The fuel rods manufactured in this way is assembled into the nuclear fuel assembly having a bundle of several hundreds of fuel rods. The nuclear fuel assembly is installed in a reactor core, and is burnt.

Thus, numerous fuel rods are required in the reactor core, and it is very important to efficiently manufacture and manage the fuel rods.

Particularly, the nuclear fuel assembly disposed in the reactor core is disposed so as to have a different enrichment level according to a position of the core, and is replaced.

For effective burnup, the fuel rods constituting the nuclear fuel assembly may be disposed so as to have a different type (e.g. a different enrichment level) according to a position at which they are disposed in the nuclear fuel assembly.

The different types of fuel rods need be discriminated and managed in the manufacturing process. The manufactured fuel rods are integratedly managed so as to be able to effectively find and rapidly assemble fuel rods of desired types when the nuclear fuel assembly is manufactured.

For example, the application of the present invention proposes an automated nuclear fuel rod loading bar and equipment for a nuclear fuel assembly in Korean Patent No. 10-0982297 (granted on Sep. 8, 2010) in order to increase a fuel rod loading speed for the nuclear fuel assembly.

SUMMARY OF THE INVENTION

Accordingly, the present invention has been made keeping in mind the above problems occurring in the related art, and an object of the present invention is to provide a fuel rod auto-loading apparatus for a nuclear fuel assembly, which automatically sorts fuel rods, each of which is assembled as a unit part, loads and stores the sorted fuel rods onto a fuel rod storage unit, unloads the fuel rods of desired types when the nuclear fuel assembly is assembled, and assembles the unloaded fuel rods into the nuclear fuel assembly.

To achieve the aforementioned object, there is provided a fuel rod auto-loading apparatus for a nuclear fuel assembly, which disposes fuel rods, each of which is assembled as a unit part, in a fuel rod case in a bundle to assemble the fuel rods into the nuclear fuel assembly. The fuel rod auto-loading apparatus includes: a fuel rod storage unit having a plurality of racks stacked so that the fuel rods are horizontally stored; a fuel rod loading unit that is raised/lowered to the racks according to a bar code marked on each fuel rod and transferring the fuel rods, each of which is assembled as the unit part, and completes an acceptance test; a feeding unit horizontally placing the fuel rods in a row unit and loading the fuel rods into the fuel rod case in the row unit; a fuel rod unloading unit selectively unloading some specific fuel rods stored in the fuel rod storage unit and transferring the specific fuel rods to the feeding unit; a fuel rod assembly lifter which is disposed parallel to the feeding unit, and on which the fuel rod case is placed so as to be able to move upward or downward; and a controller controlling driving of the fuel rod loading unit, the feeding unit, and the fuel rod unloading unit.

Here, the fuel rod loading unit may include: a loading conveyer on which a fuel rod transferred from another process is placed; a tilting part handing over the fuel rod placed on the loading conveyer to the fuel rod storage unit; and a raising/lowering driver raising/lowering the loading conveyer.

Further, the tilting part may include a driving tilting part and a driven tilting part connected to the driving tilting part by a shaft so as to be cooperated. Here, the driving tilting part may include: a fuel rod seat bar that is pivotably provided; and a seat bar driver connected to the fuel rod seat bar by a link in order to rotate the fuel rod seat bar within a predetermined angle range.

Also, the feeding unit may include: a feeding guide module that has a drive source so as to be able to move leftward/rightward relative to an upper portion of a main frame and a fuel rod sear member so as to allow the fuel rods to be placed in a row; and a feeding module that provides a driving force for loading the fuel rods placed on the feeding guide module into the fuel rod case. Preferably, the fuel rod auto-loading apparatus may further include a plurality of guide wings at the upper portion of the main frame in order to guide the fuel rods to the fuel rod seat member.

Further, the guide wings may be provided in parallel in pairs, and a tilting member may be provided between each pair of guide wings to transfer the fuel rods placed between the guide wings to the fuel rod seat member one by one. Here, the tilting member may include: a tilting lever having a second protrusion spaced apart from a first protrusion protruding from the guide wing; and a driver vertically driving the tilting lever.

In addition, the feeding unit may further include a bar code reader that reads a bar code marked on each fuel rod on a transfer path of the fuel rods loaded into the fuel rod case.

According to the fuel rod auto-loading apparatus of the present invention, the fuel rod storage unit has a plurality of racks stacked so that fuel rods, each of which is assembled as a unit part and has a bar code, are stored. The fuel rod loading unit raises/lowers the fuel rods to the racks and transfers the fuel rods. The feeding unit horizontally places the fuel rods in a row unit and loads the fuel rods into a fuel rod case in the row unit. The fuel rod unloading unit selectively unloads some specific fuel rods stored in the fuel rod storage unit and transfers the specific fuel rods to the feeding unit. The fuel rod assembly lifter is disposed parallel to the feeding unit, and is configured so that the fuel rod case is placed thereon so as to be able to move upward or downward. The controller controls the driving elements. The fuel rods, each of which is assembled as the unit part, are automatically sorted and stored, and thus inventory control of the fuel rods is efficient. Further, when the nuclear fuel assembly is assembled, fuel rods of desired types are automatically unloaded, so that productivity can be improved.

BRIEF DESCRIPTION OF THE DRAWINGS

The above and other objectives, features and advantages of the present invention will be more clearly understood from the following detailed description when taken in conjunction with the accompanying drawings, in which.

DESCRIPTION OF THE PREFERRED EMBODIMENTS

Reference will now be made in greater detail to exemplary embodiments of the present invention with reference to the accompanying drawings.

Figure 1:
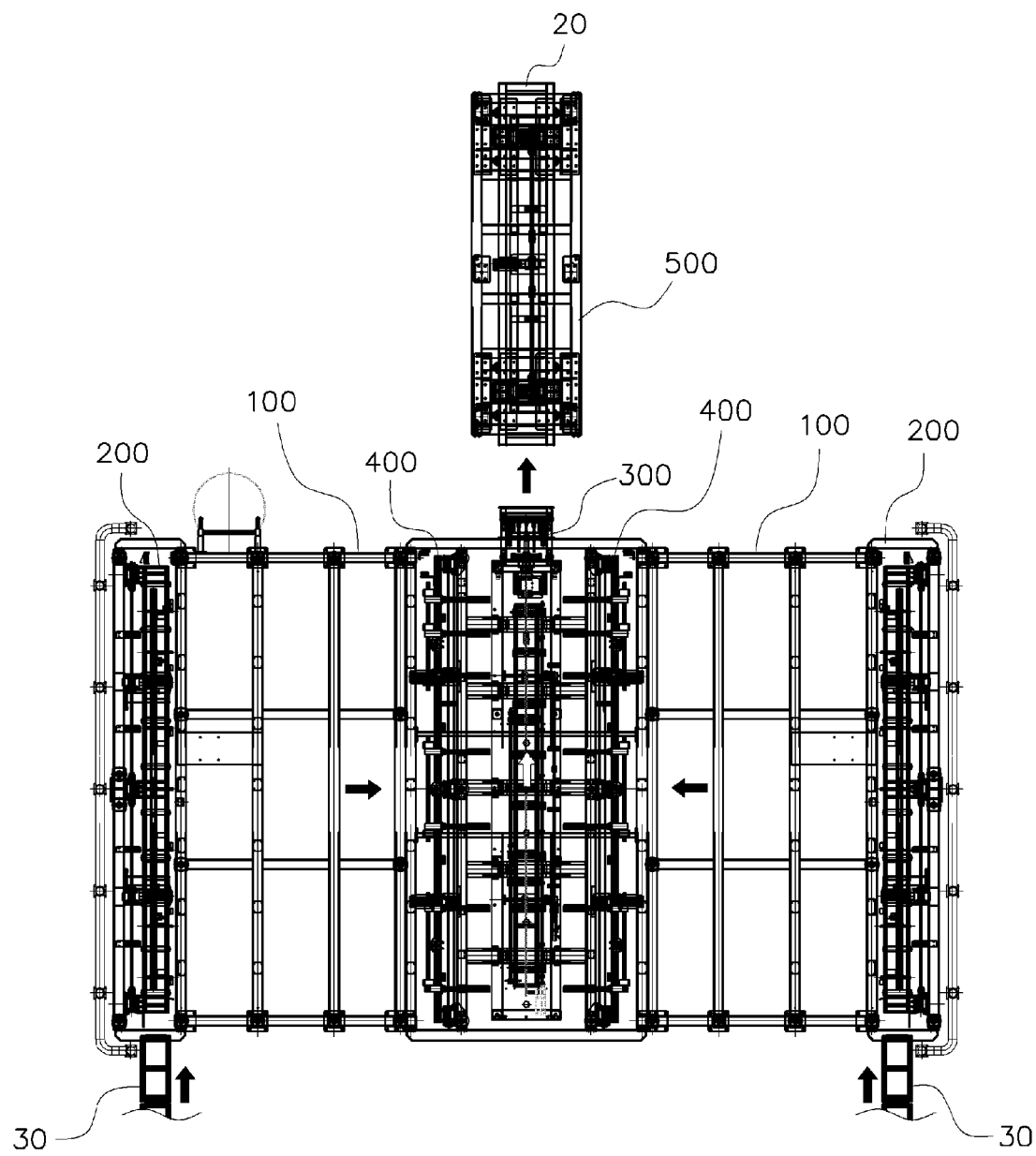
FIG. 1 is a plan view showing an entire configuration of a fuel rod auto-loading apparatus for a nuclear fuel assembly according to an exemplary embodiment of the present invention.

Referring to FIG. 1, a fuel rod auto-loading apparatus for a nuclear fuel assembly according to an exemplary embodiment of the present invention is designed to load fuel rods, each of which is assembled as a unit part, into a fuel rod case in a bundle for a fuel rod assembly in order to assemble the fuel rods into the nuclear fuel assembly, and includes a fuel rod storage unit 100, a fuel rod loading unit 200, a feeding unit 300, a fuel rod unloading unit 400, a fuel rod assembly lifter 500, and a controller 600.

The fuel rod loading unit 200 loads the fuel rods, each of which is assembled as the unit part in previous processes, and stores the fuel rods in the fuel rod storage unit 100.

The fuel rod unloading unit 400 selectively unloads some of the fuel rods stored in the fuel rod storage unit 100, and transfers the unloaded fuel rods to the feeding unit 300. The fuel rods located at the feeding unit 300 in a row unit are inserted into the fuel rod case located at the fuel rod assembly lifter 500, and are assembled into the fuel rod assembly.

In the present embodiment, the fuel rod storage units 100 are disposed at opposite sides of the feeding unit 300. To load/unload the fuel rods, each fuel rod storage unit 100 cooperates with the fuel rod loading unit 200 and the fuel rod unloading unit 400.

The controller controls the driving elements of the fuel rod auto-loading apparatus of the present invention. Information about the fuel rods stored in the fuel rod storage unit 100 can be recorded and monitored, and thus inventory control of the fuel rods can be carried out. This inventory control may be carried out through a bar code marked on a surface of each fuel rod. For example, the information for the bar code is not particularly restricted, and may include a type (enrichment level) of a pellet of the fuel rod, a manufacturing date, and so on.

First, a flow of the fuel rods will be roughly described with reference to FIG. 1. The fuel rods, each of which is assembled as a unit part and undergoes an acceptance test, are transferred to the fuel rod loading unit 200 via a manual conveyer 30.

The fuel rods transferred to the fuel rod loading unit 200 are stored in the fuel rod storage unit 100 by the fuel rod loading unit 200.

Then, the fuel rod unloading unit 400 is operated to selectively unload some of the fuel rods stored in the fuel rod storage unit 100 so as to be assembled into the fuel rod assembly, and the unloaded fuel rods are transferred to the feeding unit 300 in a row unit.

When one row of fuel rods is disposed on the feeding unit 300, the fuel rods disposed on the feeding unit 300 are loaded into the fuel rod case 20 placed on the fuel rod assembly lifter 500, and are assembled into the fuel rod assembly.

Each configuration will be described below in detail.

Figure 2:
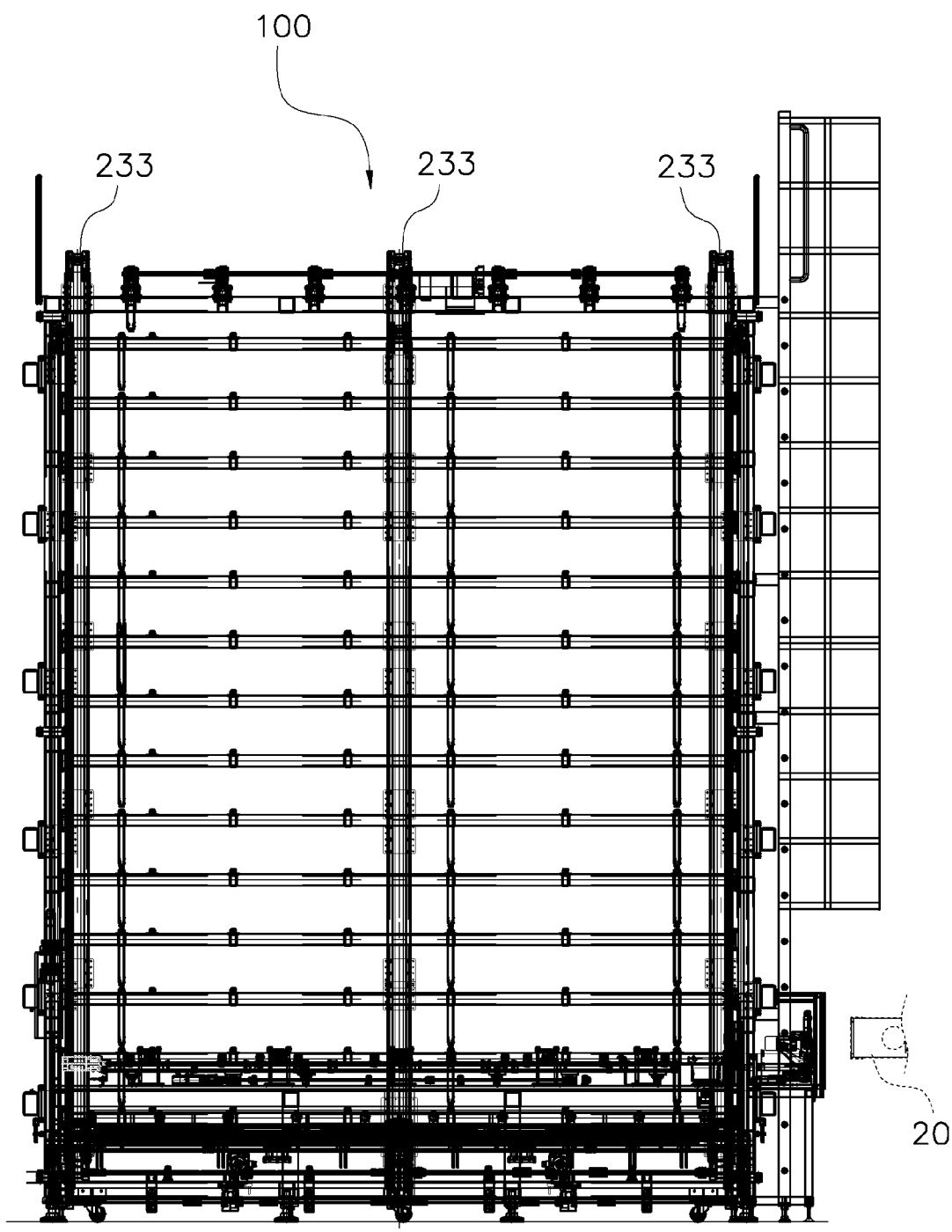
FIG. 2 is a side view showing a fuel rod storage unit in the fuel rod auto-loading apparatus according to the exemplary embodiment of the present invention.
Figure 3:
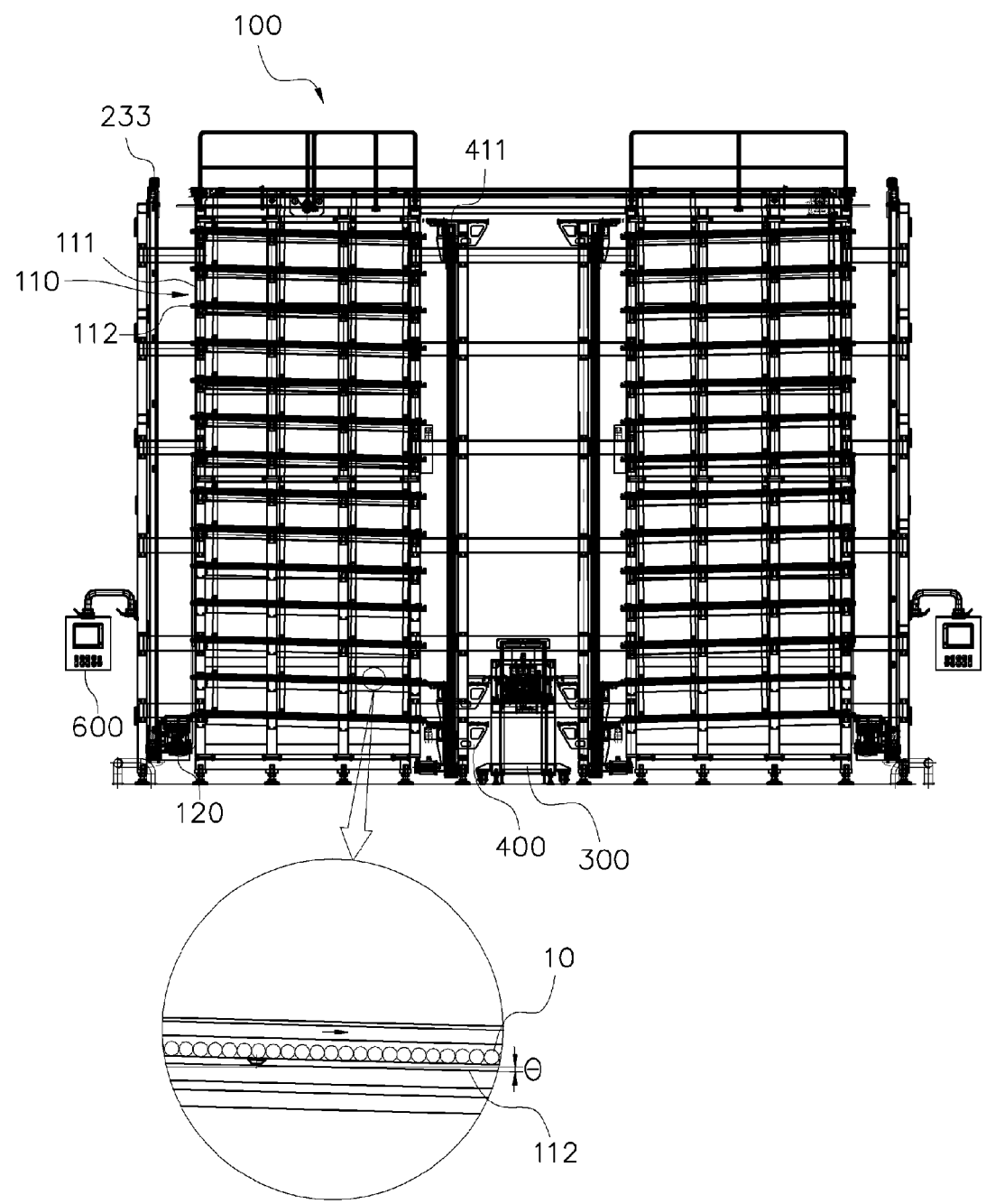
FIG. 3 is a front view showing a fuel rod storage unit in the fuel rod auto-loading apparatus according to the exemplary embodiment of the present invention.

Referring to FIGS. 2 and 3, the fuel rod storage unit 100 includes a plurality of racks 110 that are stacked so as to receive and store the plurality of fuel rods.

The racks 110 may be provided by a plurality of stationary beams 111 installed in a vertical direction and a plurality of rack bars 112 fixed to the plurality of stationary beams 111 in a transverse direction.

Particularly, as shown in FIG. 3, the rack bars 112 of the fuel rod storage unit 100 are inclined from the fuel rod loading unit 200 toward the feeding unit 300 at a smooth angle θ. Thus, the fuel rods 10 placed on the rack bars 112 by the fuel rod loading unit 200 roll toward the feeding unit 300, and are located at ends of the rack bars. Thus, in the present embodiment, the fuel rods loaded to the fuel rod storage unit 100 are unloaded in a first-in first-out order.

The fuel rod loading unit 200 functions to transfer the fuel rods, each of which is prepared as a unit part and undergoes an acceptance test, to the racks 110 in a vertical direction.

In detail, referring to FIGS. 4(a), 4(b), 4(c), and 4(d), the fuel rod loading unit 200 includes a loading conveyer 210, a tilting part 220 handing over the fuel rods from the loading conveyer 210 to the fuel rod storage unit 100, and a raising/lowering driver 230 raising/lowering the loading conveyer 210 to/from the rack 110 of a specific position (height).

The loading conveyer 210 may be made up of a plurality of rollers 212 and 213 that are rotatably installed on parallel guide rails 211. Particularly, the rollers include idle rollers 122 and power mollers 213 in which a small motor and a speed reducer are mounted and driven. Thus, the fuel rods, which are delivered via the conveyer in the previous process, can be transferred by the rollers of the loading conveyer 210.

A stopper 214 is provided at one end of the loading conveyer 210. The fuel rod 10 transferred to the loading conveyer 210 is stopped by the stopper, and thus is placed on the loading conveyer 210.

The tilting part 220 functions to transfer the fuel rods from the loading conveyer 210 to the fuel rod storage unit 100, and includes a plurality of drive tilting drivers 221 connected to a shaft 222, and stationary guides 223 and stoppers 224 installed to load the fuel rods toward the fuel rod storage unit 100 one by one along with the tilting drivers 221.

FIGS. 5(a), 5(b), 5(c), and 5(d) show an example of the tilting part of the present invention.

Figure 5:
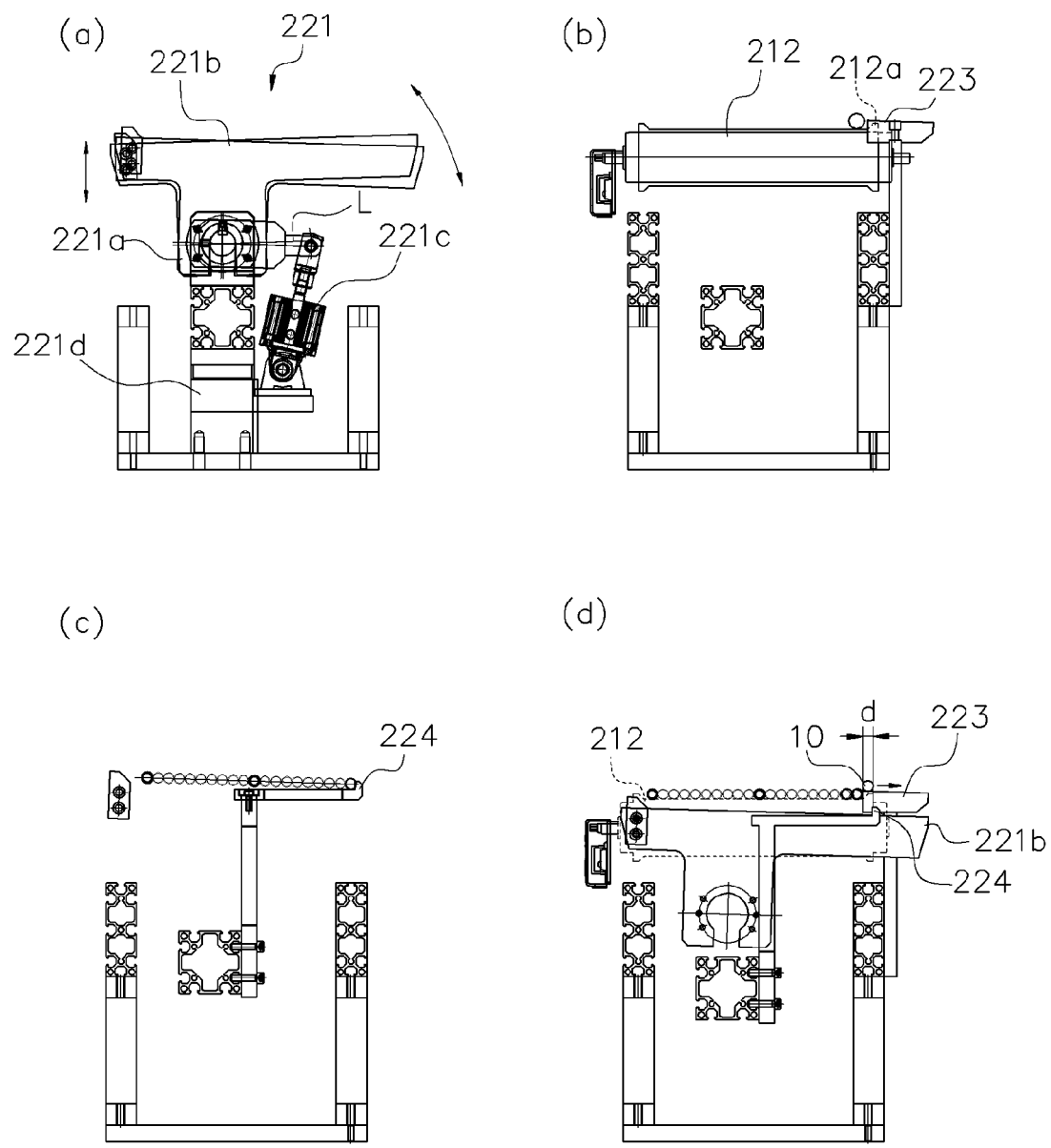
FIGS. 5(*a*) to 5(*d*) show an example of the tilting part in the fuel rod auto-loading apparatus according to the exemplary embodiment of the present invention, wherein FIG. 5(*a*) shows a driving tilting part, FIG. 5(*b*) shows a fixed guide part, FIG. 5(*c*) shows a stopper, and FIG. 5(*d*) shows an operation of the tilting part.

Referring to FIG. 5(a), each tilting driver 221 is made up of a first fuel rod seat bar 221b having a shaft coupler 221a fixed to the shaft and that is pivotably installed, a first cylinder 221c connected to the first fuel rod seat bar 221b by a link L and rotating the first fuel rod seat bar 221b within a predetermined angle range, and a second cylinder 221d driving the first fuel rod seat bar 221b in a vertical direction.

Referring to FIGS. 5(b) and 5(c), the roller 212 has ridges 212a projecting from opposite ends thereof, and a fixed guide part 223 projecting so as to be stepped inward at a predetermined distance from the ridge 212a located at a side of the fuel rod storage unit and having a predetermined slope. The stopper 224 protrudes apart from the fixed guide part 223 by almost a diameter d of the fuel rod.

Figure 4:
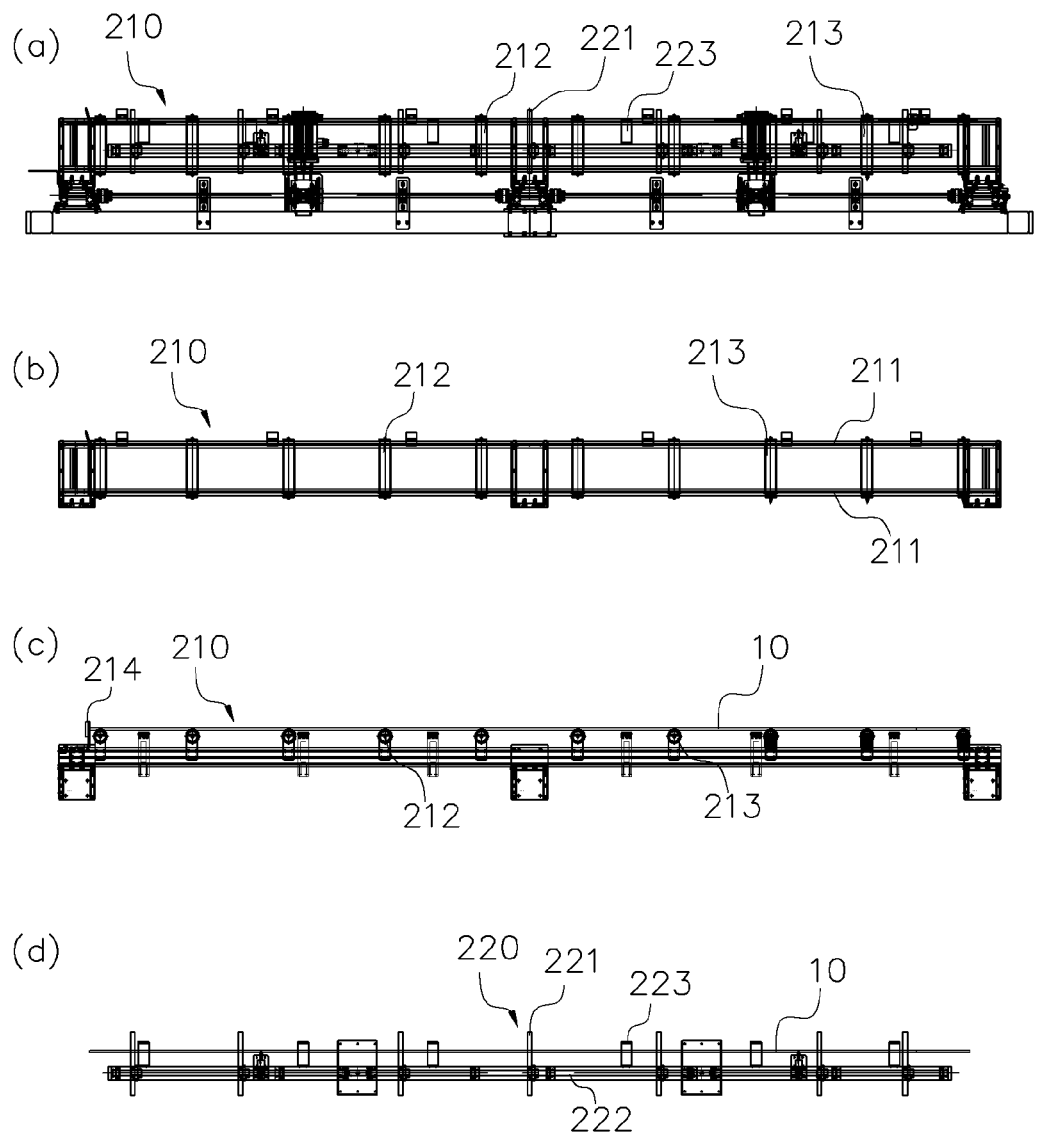
FIGS. 4(*a*) to 4(*d*) show an example of a driver of a fuel rod loading unit in the fuel rod auto-loading apparatus according to the exemplary embodiment of the present invention, wherein FIG. 4(*a*) is a plan view of the fuel rod loading unit, FIG. 4(*b*) is a plan view of a loading conveyer in the fuel rod loading unit, FIG. 4(*c*) is a front view of the loading conveyer, and FIG. 4(*d*) is a plan view showing a tilting part of the fuel rod loading unit.

With this configuration, the fuel rods are placed on the rollers 212 and 213 up to a position of the stopper 214 (see FIG. 4(c)). The fuel rods are placed on the first fuel rod seat bar 221b by upward movement of the second cylinder 221d. Next, the fuel rods move to the left side by upward movement of the first fuel rod seat bar 221b, and immediately move downward to begin to roll. As a result, the fuel rods are closely arranged based on a right-hand end of the stopper 224 (see FIG. 5(c)).

Next, the raised second cylinder 221d moves downward. In this case, only one fuel rod 10 located between the fixed guide part 223 and the stopper 224 rolls toward the fuel rod storage unit along an inclined face of the fixed guide part 223. In this way, by repetition of the upward and downward movements of the second cylinder 221d, the fuel rods are loaded toward the fuel rod storage unit one by one (see FIG. 5(d)).

Figure 6:
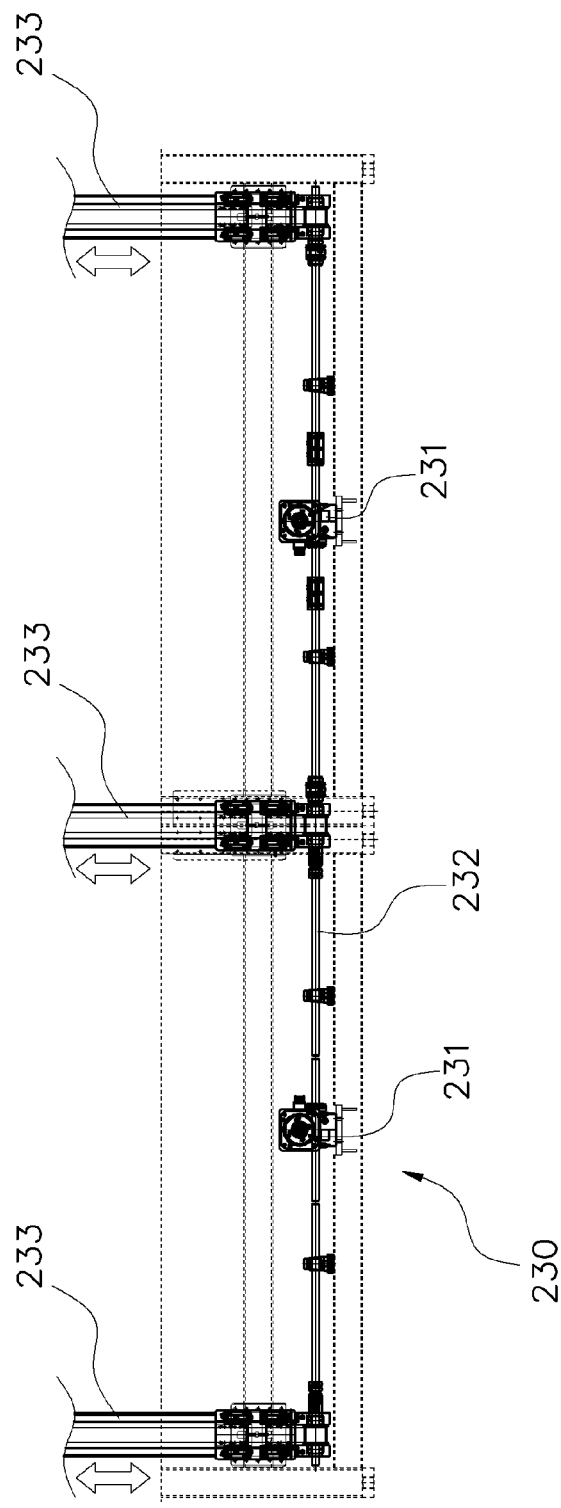
FIG. 6 shows an example of the driver of the fuel rod loading unit in the fuel rod auto-loading apparatus according to the exemplary embodiment of the present invention.

Referring to FIG. 6, the raising/lowering driver 230 includes a drive shaft 232 driven by a servo motor 231, and a timing belt connected to the drive shaft 232 in order to raise/lower the loading conveyer 210 along a linear guide frame 233. A means for raising/lowering the loading conveyer is not limited to the timing belt.

The information about the fuel rods loaded onto the fuel rod storage unit 100 by the fuel rod loading unit 200 in this way is identified by the bar code marked on each fuel rod, and is stored in the controller. Thus, a number, a type, etc. of the fuel rods loaded onto the fuel rod storage unit 100 can be checked through a display connected to the controller.

To this end, the fuel rod loading unit 200 may be equipped with a known bar code reader. Here, the bar code reader reads the bar code information about the fuel rods transferred to the fuel rod loading unit 200, and sends the read information to the controller. The controller records the bar code information about the fuel rods, and stores the recorded information in the fuel rod storage unit 100 along with information about stored positions.

Meanwhile, the plurality of racks 110 installed on the fuel rod storage unit 100 are divided according to the type of the stored fuel rod. Thus, it is apparent that the fuel rods can be sorted and managed on the racks.

The feeding unit 300 horizontally places the fuel rods in place in a row unit in order to feed the fuel rods into the fuel rod case 20. The feeding unit 300 includes a feeding guide module 310 that can move leftward/rightward or forward/backward on a main frame 301 and prepares the fuel rods loaded into the fuel rod case in a row unit, and a feeding module 320 that transfers the fuel rods prepared by the feeding guide module 310 to the fuel rod case.

The feeding unit 300 may be additionally provided with a bar code reader 330 that is adjacent to the feeding module 320 and reads the bar codes of the fuel rods loaded into the fuel rod case. The bar code reader 330 finally checks the information about the fuel rods assembled in the fuel rod case to prevent the fuel rods from being incorrectly assembled.

Figure 7:
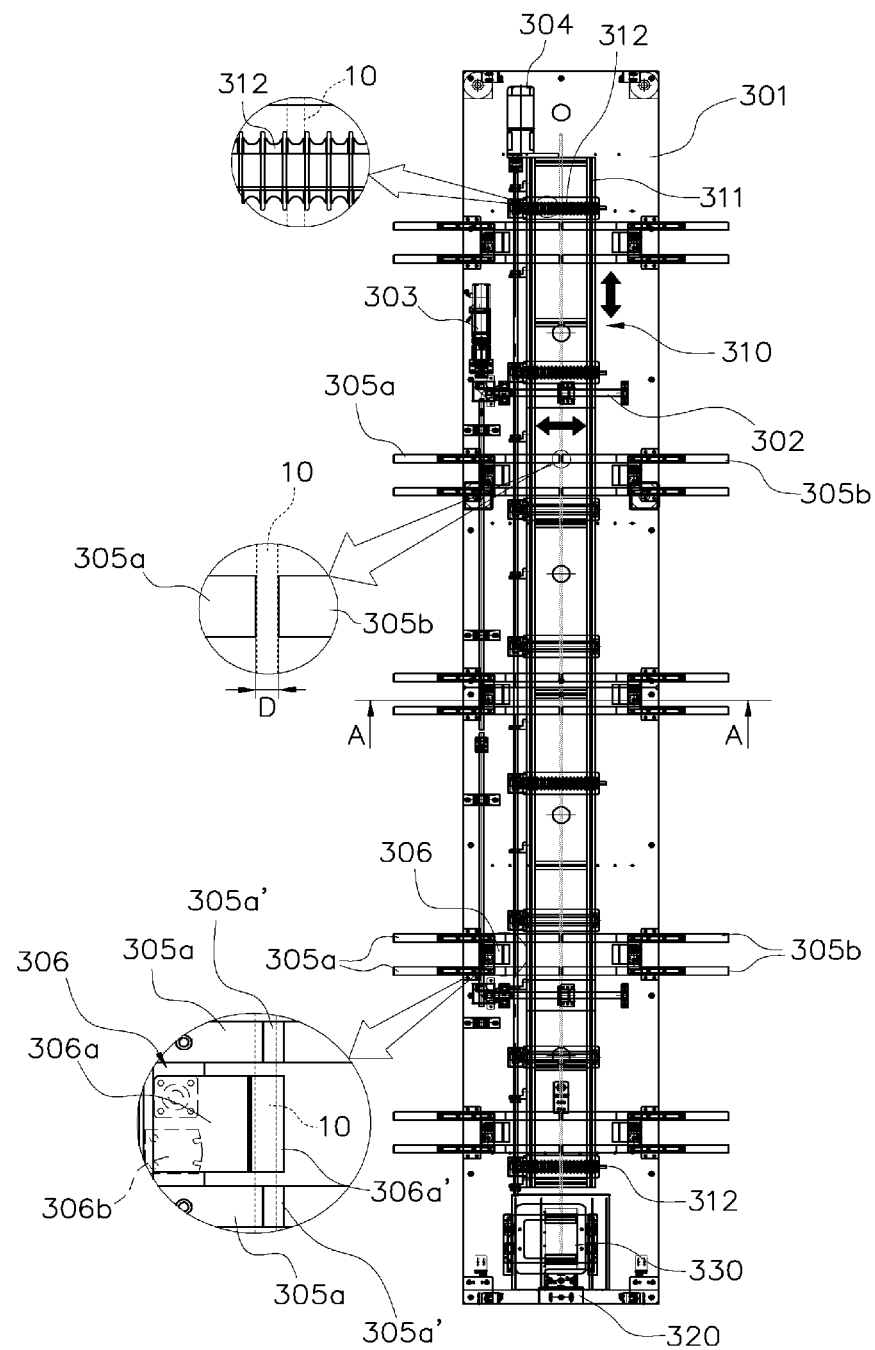
FIG. 7 is a plan view of a feeding unit in the fuel rod auto-loading apparatus according to the exemplary embodiment of the present invention.

Referring to FIG. 7, a plurality of ball screws 302 are provided on the main frame 301 so as to be perpendicular to a lengthwise direction. The ball screws 302 are coupled to the feeding guide module 310 that can move leftward/rightward perpendicular to the lengthwise direction of the main frame 301 in a rotational direction of the ball screws 302.

The main frame 301 is provided with a servo motor 303 that drives the ball screws 302 to control a left-/right-hand position of the feeding guide module 310 and is meshed with the ball screws 302 by a helical gear.

The feeding guide module 310 is made up of a plurality of stationary frames 311. The stationary frames 311 are provided with a plurality of fuel rod seat members 312 in a lengthwise direction so as to allow the fuel rods 10 to be accurately placed in a row unit. In the present embodiment, the fuel rod seat members 312 may include rotatable rollers coated with silicon.

Further, the main frame 301 is provided with a driving motor 304 at one side thereof. The fuel rod seat members 312 can be rotated by the driving motor 304.

A plurality of first and second guide wings 305a and 305b are installed on the feeding guide module 310 at opposite upper portions of the main frame 301 in order to hand over the fuel rods from the fuel rod unloading unit 400 to the fuel rod seat members 312.

The first and second guide wings 305a and 305b are inclined toward the center of the feeding guide module 310. Further, a predetermined distance D is formed between the first and second guide wings 305a and 305b so that only one fuel rod 10 passes therethrough. Thus, the fuel rods, which are delivered from the fuel rod unloading unit 400 and are placed on the first or second guide wing 305a or 305b, move to the feeding guide module 310.

Particularly, in the present embodiment, the fuel rods placed on the first or second guide wing 305a or 305b can move to the feeding guide module 310 one by one. To this end, in the present embodiment, the guide wings are provided in pairs. A tilting member for selectively delivering the fuel rods to the feeding guide module 310 one by one may be provided between the pair of guide wings.

Figure 8:
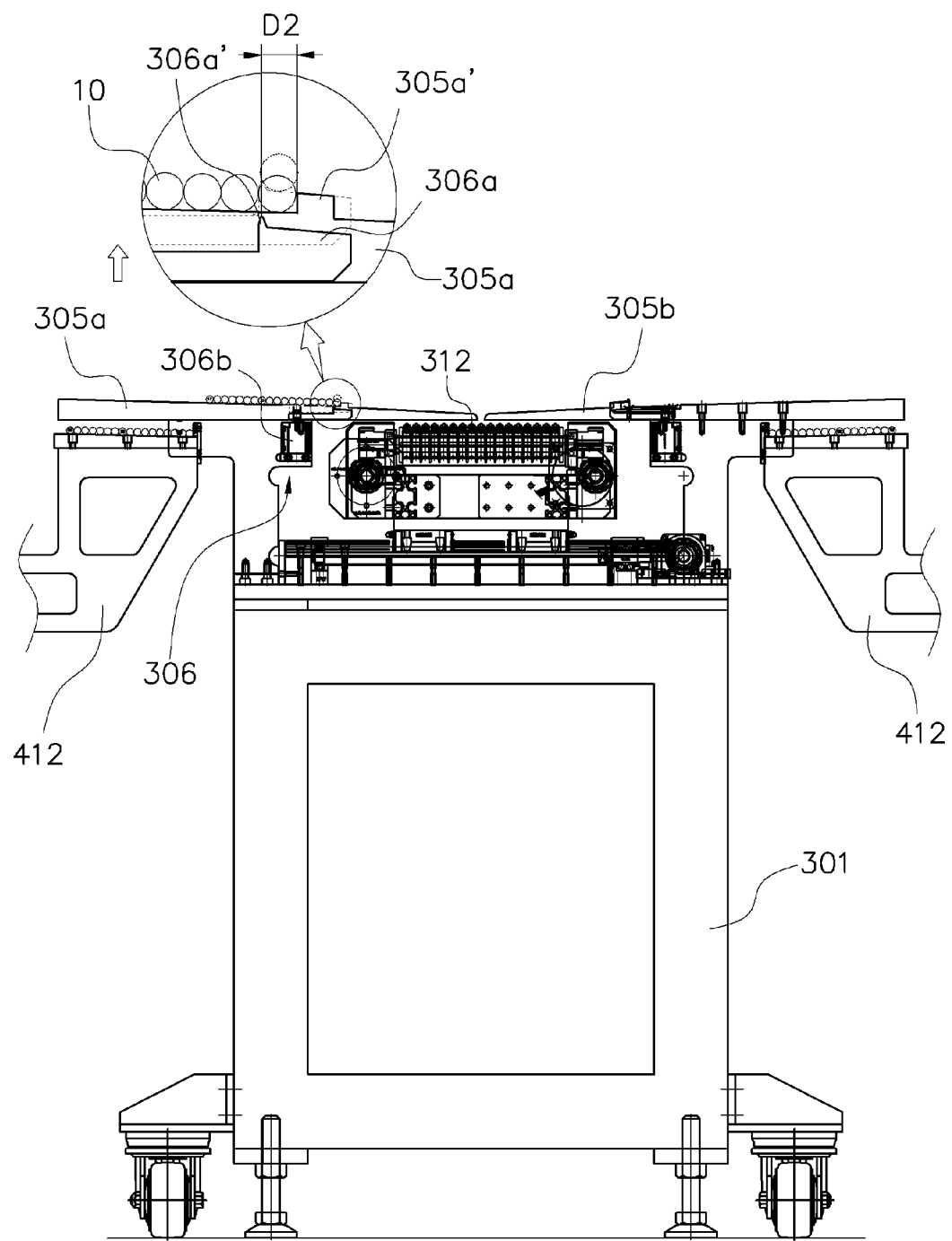
FIG. 8 is a cross-sectional view taken along line A-A of FIG. 7.

In detail, referring to FIGS. 7 and 8, the pair of first guide wings 305a are provided with first protrusions 305a' protruding upward, respectively. The tilting member 306 that can transfer the fuel rods across the first protrusions 305a' one by one is provided between the pair of first guide wings 305a.

The tilting member 306 includes a tilting lever 306a having a second protrusion 306a' protruding apart from each first protrusion 305a' by a predetermined distance D2 (about the diameter of the fuel rod), and a cylinder 306b vertically driving the tilting lever 306a at a lower portion of the tilting lever 306a.

An operation of the tilting member 306 configured in this way will be described in brief with reference to FIG. 7. The fuel rods 10 located at the first guide wings 305a are stopped by the first protrusions 305a'. Here, when the cylinder 306b is operated and the tilting lever 306a moves upward, only one fuel rod located between the first protrusions 305a' and the second protrusion 306a' moves upward, and then rolls across the first protrusions 305a' toward the fuel rod seat member 312 along the first guide wings 305a.

Thus, the tilting member 306 can selectively transfer only one fuel rod to the fuel rod seat member 312 by one reciprocation based on the driving of the cylinder 306b.

Further, the servo motor 303 is operated according to the specific fuel rods selectively placed on and fed from the first or second guide wings 305a or 305b by the tilting member 306, and thereby the left-/right-hand position of the feeding guide module 310 is adjusted. Thus, the specific fuel rods can be designated to and placed at specific positions of the fuel rod seat members 312.

Figure 9:
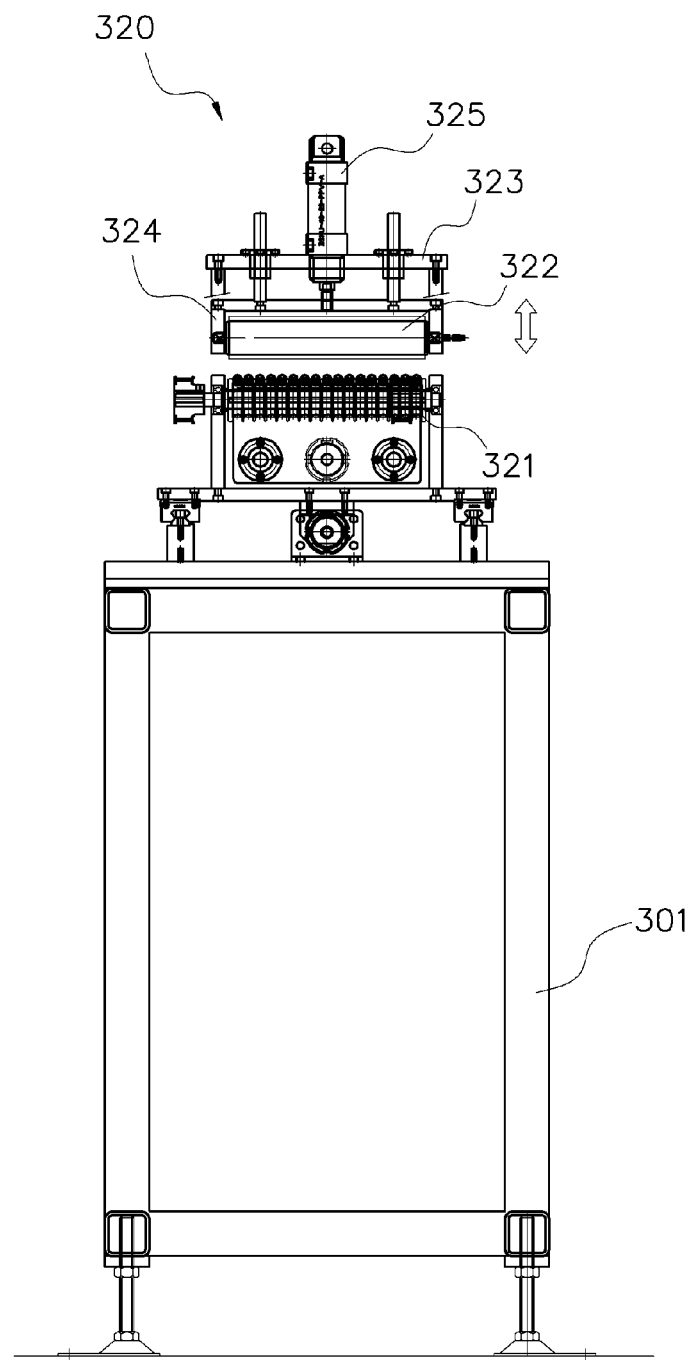
FIGS. 9 and 10 are front and side views of a feeding module in the fuel rod auto-loading apparatus according to the exemplary embodiment of the present invention.

Referring to FIG. 9, the feeding module 320 is installed on a leading end of the main frame 301 of the feeding unit 300, and advances rows of the fuel rods placed on all the rows of the fuel rod seat members 312 to the fuel rod case in order to assemble the fuel rods. The feeding module 320 includes a partition roller 321 driven by a motor and a power moller 322 that is located above the partition roller 321 and is able to move upward or downward.

In detail, a first bracket 323 is fixedly installed at the upper portion of the main frame 301, and the power moller 322 is rotatably installed at a lower end of the first bracket 323. A second bracket 324 is provided so as to be able to move upward or downward. Further, a pneumatic cylinder 325 is fixed to the first bracket 323 so as to raise or lower the second bracket 324. Thereby, the power moller 322 is raised or lowered.

Figure 10:
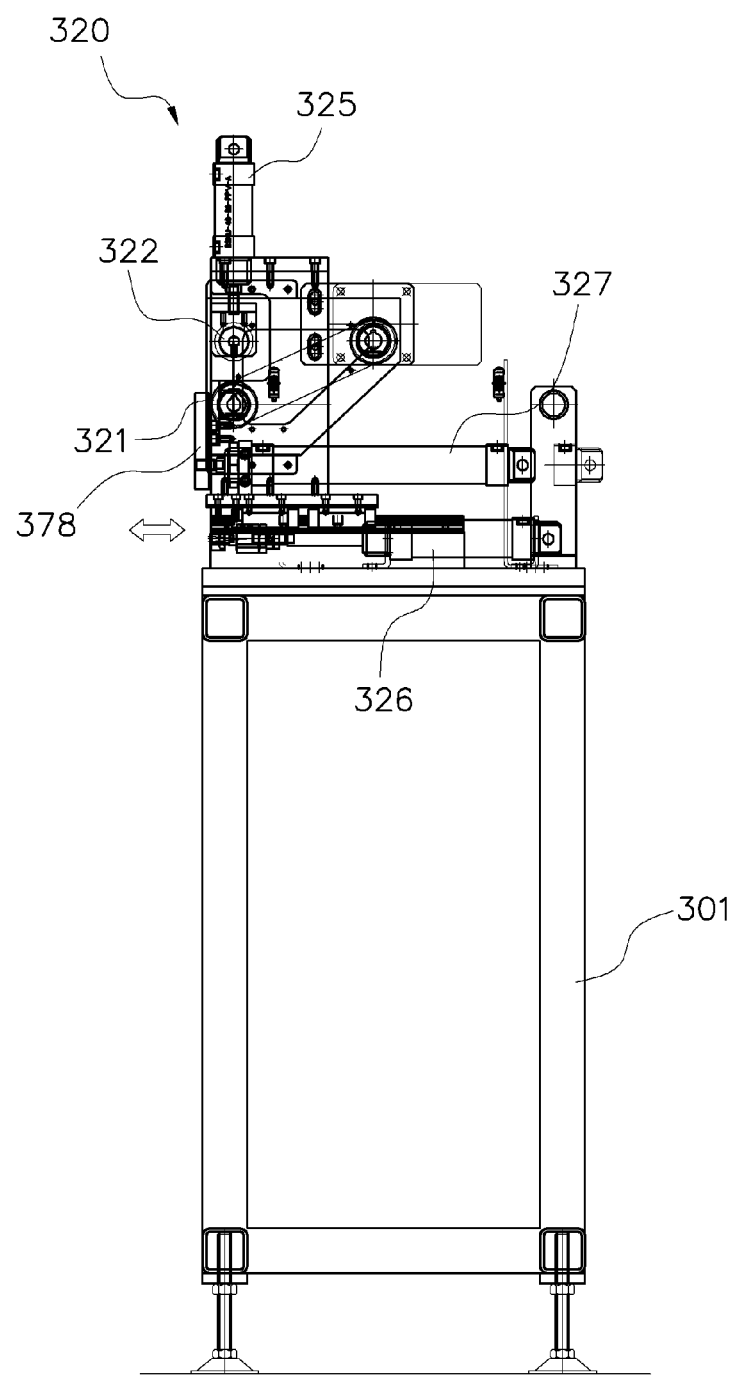

As shown in FIG. 10, the partition roller 321 and the power moller 322 are guided by a liner guide member and are driven forward or backward by a transfer cylinder 326.

Further, a push cylinder 327 is provided at an upper portion of the transfer cylinder 326. A push plate 378 is provided at a leading end of the feeding module 320, and is driven forward or backward to load the fuel rod by the push cylinder 327.

Accordingly, when the fuel rods are placed on the feeding guide module 310, the power moller 322 is lowered, and then the partition roller 321 and the power moller 322 are advanced toward the fuel rod case by the transfer cylinder 326. Then, when the fuel rod seat members 312 is driven by the driving motor 304 installed at a trailing end of the main frame 301, leading ends of the fuel rods are located between the partition roller 321 and the power moller 322 by a frictional force of the fuel rod seat members 312 and the fuel rods. Then, driving forces of the partition roller 321 and the power moller 322 are added, and thus the fuel rods are loaded into the fuel rod case.

After the fuel rods are loaded into the fuel rod case, the partition roller 321 and the power moller 322 move backward by the transfer cylinder 326. After the fuel rod assembly lifter 500 is lowered, the push cylinder 327 is driven, and the push plate 378 is driven to completely push the fuel rods into the fuel rod case.

Figure 11:
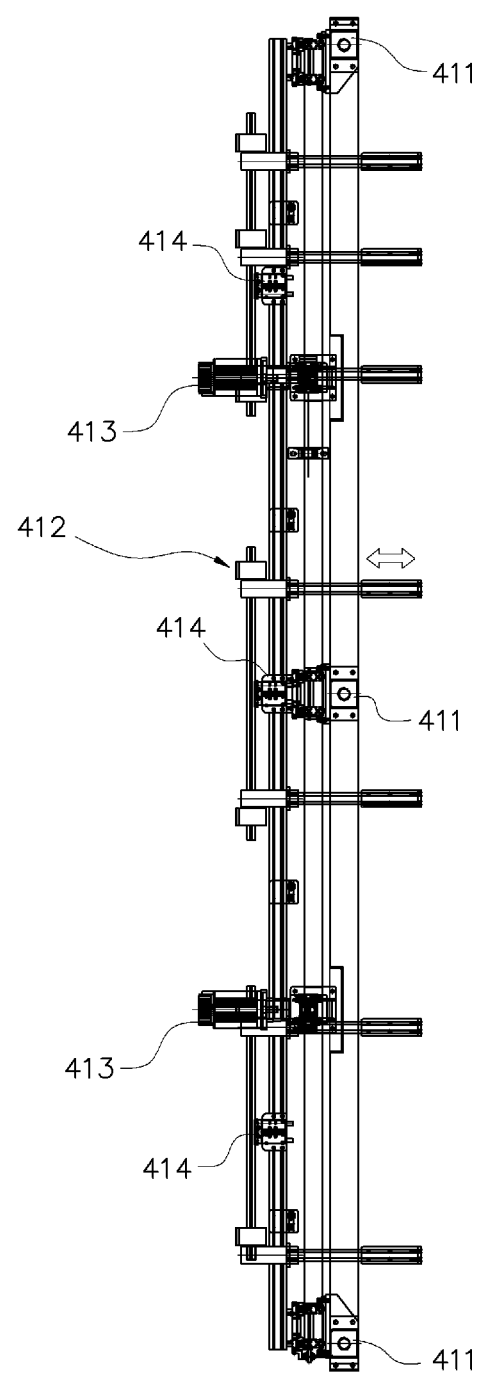
FIG. 11 is a plan view showing an example of a fuel rod unloading unit in the fuel rod auto-loading apparatus according to the exemplary embodiment of the present invention.

Referring to FIG. 11, the fuel rod unloading unit 400 selectively unloads the specific fuel rods stored in the fuel rod storage unit 100 and transfers the fuel rods to the feeding unit 300. The fuel rod unloading unit 400 includes a plurality of vertical frames 411 vertically installed adjacent to the fuel rod storage unit 100, and a plurality of fuel rod withdrawal bars 412 that are allowed to provide vertical upward/downward movement and horizontal forward/backward movement relative to the vertical frames 411.

The fuel rod unloading unit 400 is provided with servo motors 413 vertically driving the fuel rod withdrawal bars 412, and pneumatic cylinders 414 moving the fuel rod withdrawal bars 412 in a forward or backward direction. It can be evidently understood that, for the smooth upward/downward or forward/backward movement of the fuel rod withdrawal bars 412, a speed reducer, a timing belt, or a linear motion (LM) guide may be used.

Figure 12:
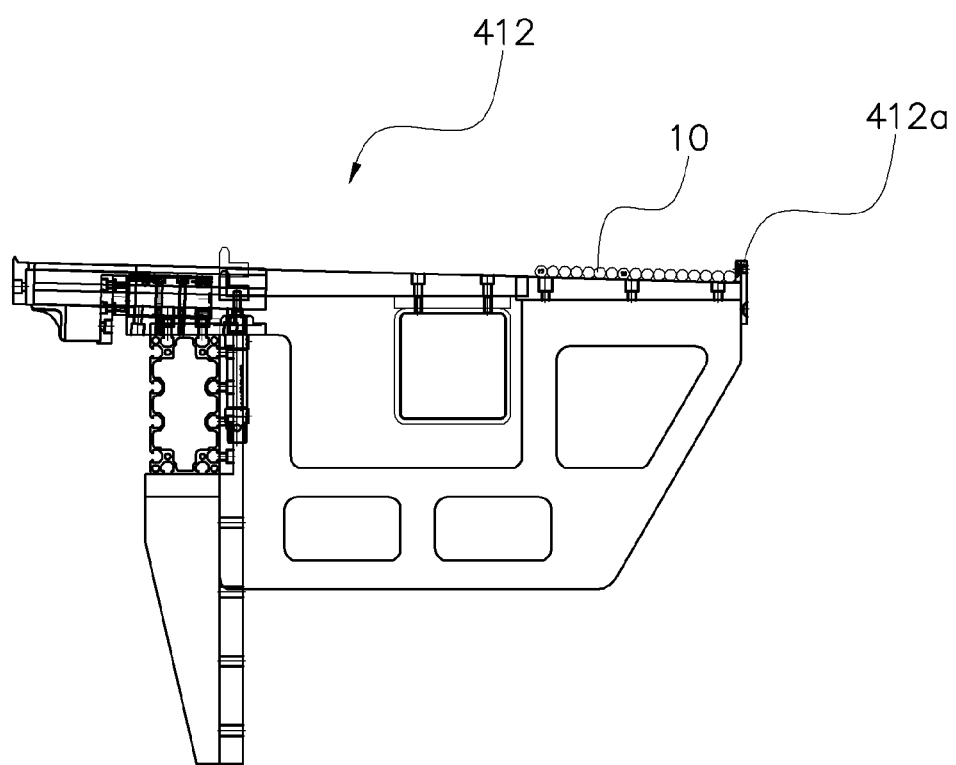
FIG. 12 is a front view of a fuel rod withdrawal bar installed on the fuel rod unloading unit in the fuel rod auto-loading apparatus according to the exemplary embodiment of the present invention.

FIG. 12 shows the fuel rod withdrawal bar provided to the fuel rod unloading unit. The fuel rod withdrawal bar 412 is configured so that an upper end thereof has a smooth slope to place the fuel rods 10 and so that a protruding end plate 412a is fixed to a leading end thereof.

Figure 13:
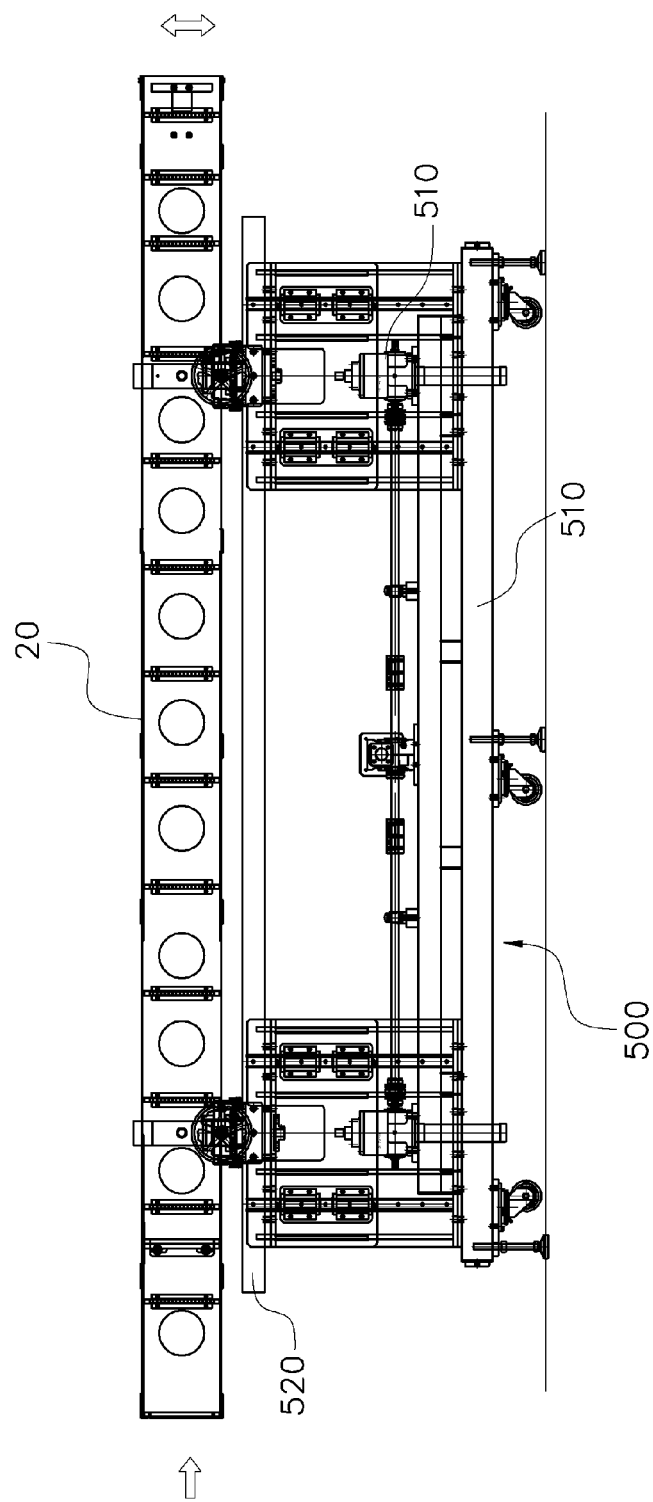
FIGS. 13 and 14 are front and side views of a fuel rod assembly lifter in the fuel rod auto-loading apparatus according to the exemplary embodiment of the present invention.
Figure 14:
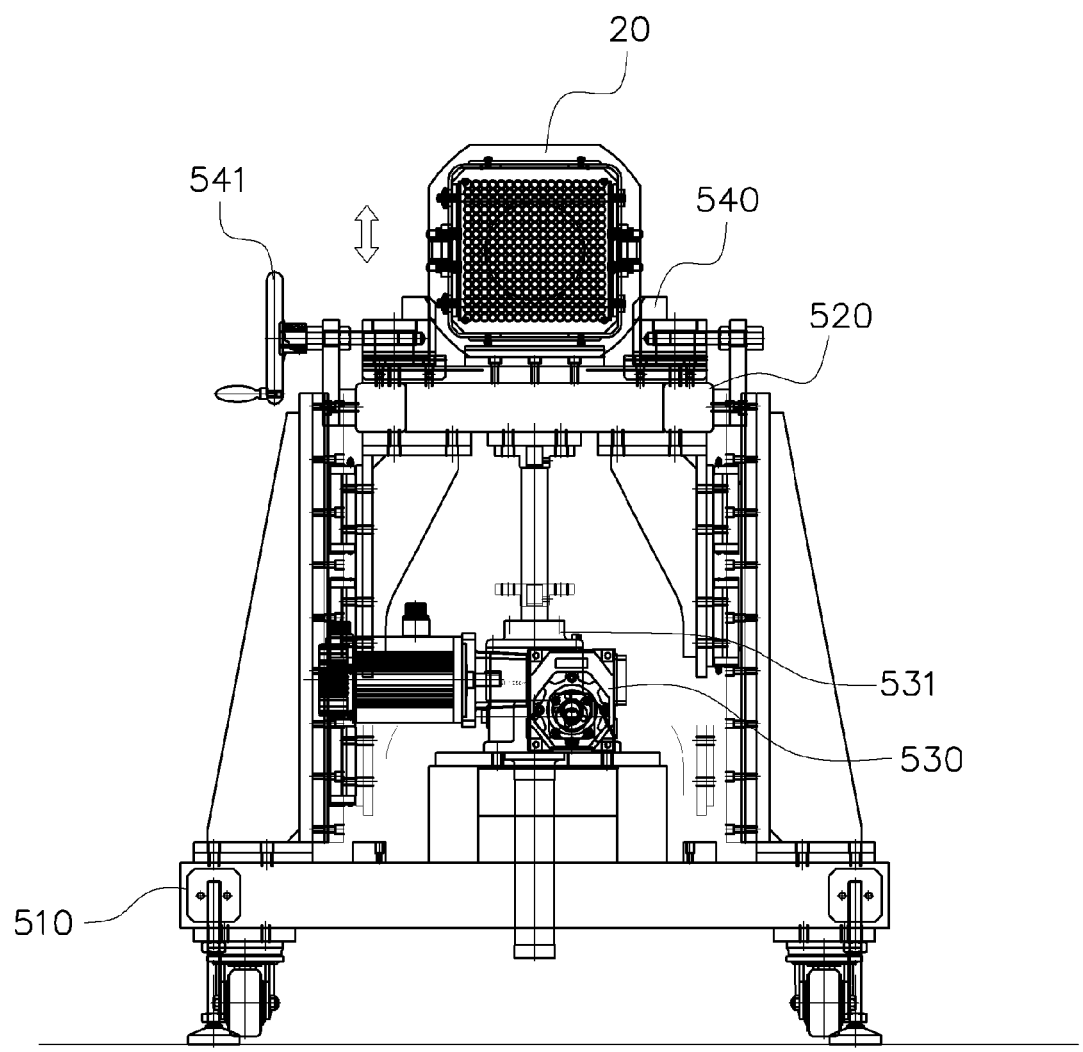
Figure 15:
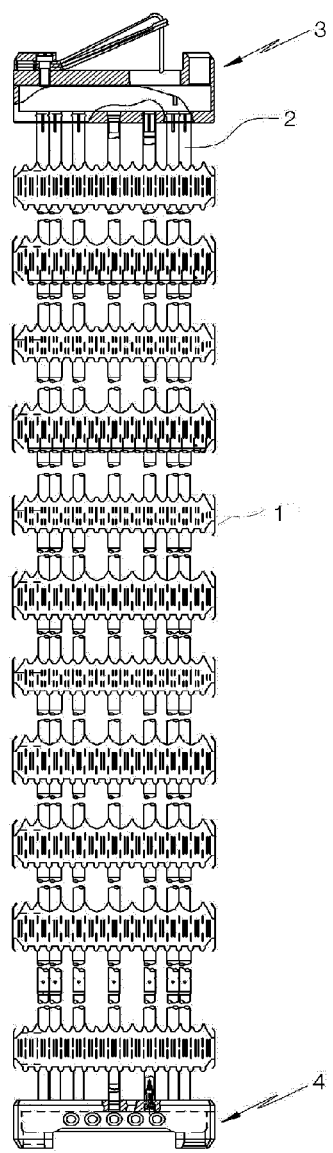
FIG. 15 shows a configuration of a typical nuclear fuel assembly.

Referring to FIGS. 13 and 14, the fuel rod assembly lifter 500 is disposed parallel with the feeding unit, and has a structure in which the fuel rod case 20 is placed and is able to move upward or downward.

The fuel rod assembly lifter 500 includes a lower frame 510 fixed to a floor, an upper frame 520 moving upward/downward relative to the lower frame 510, and a servo motor 530 raising/lowering the upper frame 520.

The servo motor 530 may be coupled with a speed reducer and a ball screw jack 531 to smoothly raise/lower the upper frame 520. A guide member that guides a raising/lowering direction of the upper frame 520 may be provided.

Further, the fuel rod assembly lifter 500 may include a fixing block 540 fixing the fuel rod case 20 placed on the upper frame 520, and a handle 541 adjusting clamping/unclamping of the fixing block 540.

The controller 600 controls driving of the fuel rod loading unit 200, the feeding unit 300, and the fuel rod unloading unit 400, or the other driving elements, and records and stores the number and type of the fuel rods loaded onto or unloaded from the fuel rod storage unit 100 by way of the bar codes marked on the fuel rods.

Although not described specifically in the present embodiment, known sensors may be used to detect or control accurate driving positions of the driving elements typically used for process automation. It is apparent that signals of the sensors are transmitted to the controller for accurate control of the driving elements.

Although an exemplary embodiment of the present invention has been described for illustrative purposes, those skilled in the art will appreciate that various modifications, additions and substitutions are possible, without departing from the scope and spirit of the invention as disclosed in the accompanying claims. For example, the motor, the hydraulic or pneumatic cylinder, the servo motor, etc. illustrated to drive the driving elements in the present embodiment may be substituted or modified by various known driving means.

What is claimed is:

1. A fuel rod auto-loading apparatus for a nuclear fuel assembly, the fuel rod auto-loading apparatus comprising:
    a fuel rod storage unit including
        a plurality of stationary beams installed in a vertical direction, and
        a plurality of racks fixed to the plurality of stationary beams, wherein the racks are stacked one above the other and on which fuel rods are horizontally stored;
    a fuel rod loading unit configured to supply the fuel rods to the fuel rod storage unit;
    a fuel rod unloading unit configured to unload the fuel rods from the fuel rod storage unit, wherein the fuel rod loading unit and the fuel rod unloading unit are disposed in opposite sides of the fuel load storage unit with each other;
    a feeding unit configured to arrange the fuel rods transferred from the fuel rod unloading unit for loading the fuel rods into a fuel rod case;
    a fuel rod assembly lifter disposed collinearly in a longitudinal direction with the feeding unit, and configured to move upward or downward the fuel rod case separably placed on the fuel rod assembly lifter; and
    a controller controlling the fuel rod loading unit, the feeding unit, and the fuel rod unloading unit,
    wherein the fuel rod unloading unit, the fuel rod storage unit, the fuel rod unloading unit and the feeding unit are disposed in order.

2. The fuel rod auto-loading apparatus set forth in claim 1, wherein the fuel rod loading unit includes:
    a loading conveyer on which the fuel rod transferred from another process is placed;
    a tilting part handing over the fuel rod placed on the loading conveyer to the fuel rod storage unit; and
    a raising/lowering driver raising/lowering the loading conveyer.

3. The fuel rod auto-loading apparatus set forth in claim 2, wherein the tilting part includes a driving tilting part and a driven tilting part connected to the driving tilting part by a shaft so as to be cooperated.

4. The fuel rod auto-loading apparatus set forth in claim 3, wherein the driving tilting part includes:
    a fuel rod seat bar that is pivotably provided; and
    a seat bar driver connected to the fuel rod seat bar by a link in order to rotate the fuel rod seat bar within a predetermined angle range.

5. The fuel rod auto-loading apparatus set forth in claim 1, wherein the feeding unit includes:
    a feeding guide module that has a drive source so as to be able to move leftward/rightward relative to an upper portion of a main frame and a fuel rod seat member so as to allow the fuel rods to be placed in a row; and
    a feeding module that provides a driving force for loading the fuel rods placed on the feeding guide module into the fuel rod case.

6. The fuel rod auto-loading apparatus set forth in claim 5, further comprising a plurality of guide wings at the upper portion of the main frame in order to guide the fuel rods to the fuel rod seat member.

7. The fuel rod auto-loading apparatus set forth in claim 6, wherein the guide wings are provided in parallel in pairs, and a tilting member is provided between each pair of guide wings to transfer the fuel rods placed between the guide wings to the fuel rod seat member one by one.

8. The fuel rod auto-loading apparatus set forth in claim 7, wherein the tilting member includes:
    a tilting lever having a second protrusion spaced apart from a first protrusion protruding from the guide wing; and
    a driver vertically driving the tilting lever.

9. The fuel rod auto-loading apparatus set forth in claim 1, wherein the feeding unit further includes a bar code reader that reads a bar code marked on each fuel rod on a transfer path of the fuel rods loaded into the fuel rod case.

10. The fuel rod auto-loading apparatus set forth in claim 1, wherein each of the racks includes a plurality of rack bars fixed to the plurality of stationary beams in a transverse direction, such that the plurality of rack bars are inclined from the fuel rod loading unit toward the fuel rod unloading unit at a predetermined angle.

* * * * *